United States Patent [19]

Griffey

[11] Patent Number: 4,723,167
[45] Date of Patent: Feb. 2, 1988

[54] TURN-OFF CIRCUIT FOR PROJECTION TELEVISION CRT

[75] Inventor: Donald E. Griffey, Skokie, Ill.

[73] Assignee: Zenith Electronics Corporation, Glenview, Ill.

[21] Appl. No.: 18,147

[22] Filed: Feb. 24, 1987

[51] Int. Cl.[4] .............................................. H04N 5/63
[52] U.S. Cl. .................................... 358/190; 358/243; 358/220; 315/381
[58] Field of Search ................. 358/190, 74, 243, 220; 315/381, 386, 411

[56] References Cited

U.S. PATENT DOCUMENTS

| | | | |
|---|---|---|---|
| 2,155,486 | 4/1939 | Günther | 358/220 X |
| 3,351,804 | 11/1967 | Kongable et al. | 315/381 |
| 3,535,445 | 10/1970 | Griffey | 358/190 X |
| 3,956,669 | 5/1976 | Del Ciello | 358/190 X |
| 4,521,720 | 6/1985 | Griffey | 315/386 |
| 4,677,351 | 6/1987 | Brust et al. | 315/386 |

Primary Examiner—James J. Groody
Assistant Examiner—E. Anne Faris

[57] ABSTRACT

A shutdown circuit for a projection type CRT comprises a transistor switch for operating a relay, responsive to a turn-off signal, to immediately break the high B+ operating voltage connection to a horizontal deflection system. A switched mode power supply is supplied with the turn-off signal, after a delay caused by a resistance-capacitance circuit, for shutting down the low voltage drive voltage to the horizontal deflection system after occurrence of the turn-off signal.

7 Claims, 1 Drawing Figure

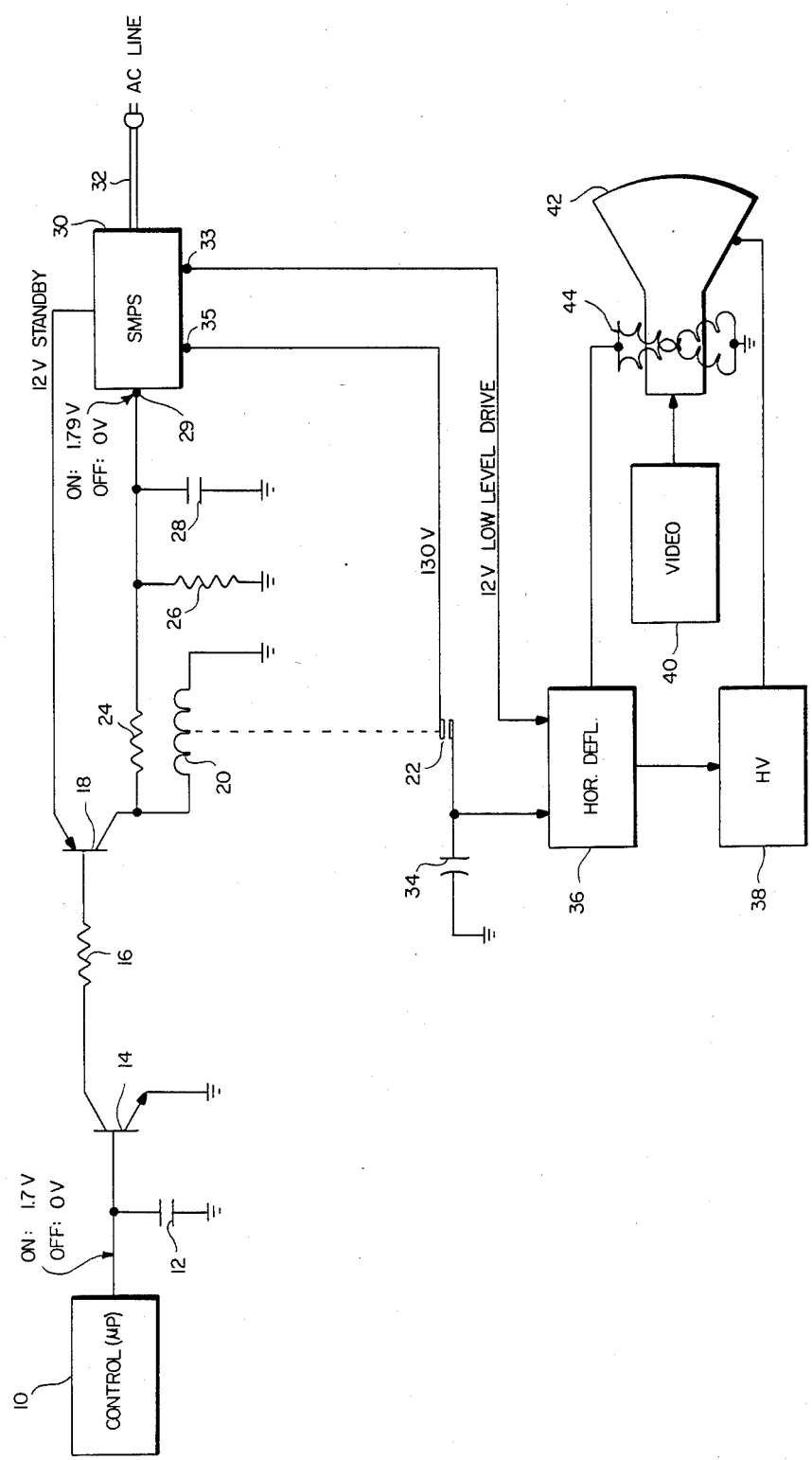

TURN-OFF CIRCUIT FOR PROJECTION TELEVISION CRT

BACKGROUND OF THE INVENTION AND PRIOR ART

This invention relates generally to turn-off circuits for preventing phosphor burns on the viewing screens of CRTs and particularly to a turn-off circuit used in connection with non-shadow mask projection type CRTs supplied from switched mode power supplies.

A CRT (cathode ray tube) includes an electron gun situated at one end of an evacuated envelope for developing an electron beam that is accelerated toward a light-emitting phosphor target or screen comprising the other end of the CRT. The screen is generally deposited on the inner surface of the CRT faceplate. Magnetic deflection windings, or electrostatic deflection plates, are suitably disposed about the CRT neck and supplied with appropriate horizontal and vertical deflection voltages for deflecting or "sweeping" the electron beam in a pattern over the phosphor screen to define a rectangular-shaped raster. The electron beam is modulated in intensity during its deflection to develop the video display. In direct view color CRTs, a foraminous mask is interposed between the electron gun and the screen for "shadowing" different colored light emitting phosphors from all but their associated electron beams. As is well-known the foraminous mask, or shadow mask as it is commonly referred to, is impacted by and therefore absorbs much of the beam energy. Consequently, phosphor burn due to excessive beam energy in direct view color CRTs is not as serious a problem as it was with monochrome CRTs.

So-called projection television receivers commonly use three independent, different colored CRTs. For example, the color CRTs may comprise individual red, blue and green light emitting types. In such tubes, no shadow mask is required. Rather, three independent images are generated, one in each of the basic colors red, blue and green, and combined, either by direct projection or through a mirror system, to form a resultant color image on a display surface. In these systems, the sources (color CRTs) are small and the final image is large, which requires that the color tubes be driven hard to generate the large light outputs required in projection applications. The combination of large electron beam current and the lack of a shadow mask, makes such projection tubes prone to phosphor burn by the undeflected electron beam in the event appropriate safeguards are not taken when turning the set off. The problem is compounded with the use of switched mode power supplies in which the power supply is on continuously, with the load circuits being switched as needed. The significance of the problem is apparent when considering the high cost of such CRTs and the relative ease with which phosphor burn may occur.

It is conventional practice, when turning off a CRT, to blank the video to cut off the electron beam. In that instance, there is no undeflected electron beam to come to rest at a central spot on the CRT screen and the problem of phosphor burn is not present. However, should the blanking circuitry fail or, as is more likely, should the blanking circuitry operate ineffectively, there is the danger that an electron beam of significant energy may be present when the deflection circuits collapse the raster to a very small area. Hence the problem of phosphor burn is ever present.

Difficulties may also arise should operation of the blanking circuit be compromised, which can occur for a number of reasons. One is that the CRT G2 grid voltage may be very high and cause a shift in the tube cut-off characteristic. It is very common for service personnel to adjust the G2 voltage to its maximum to compensate for a loss in tube brightness due to low cathode emission. Such a tube may experience impaired blanking due to the high G2 voltage and make it prone to phosphor burn upon turn off despite a fully functional and operating blanking circuit. Another problem may be inadvertently introduced by the presence of a safety circuit that is often built into projection TVs to prevent overheating of the CRTs. In some receivers, the CRTs are driven so heavily (to obtain brightness levels suitable for projection viewing) that their frit seals, that is, the glass bonds between the CRT faceplate and funnel may fail because of the differential thermal expansion between the relatively thick faceplate and relatively thin funnel. A high electron beam shut off circuit may be used to turn off the receiver. Turning off the receiver under these conditions may result in compromising the effectiveness of the blanking circuit and pose the threat of phosphor burn. Further, such shutdown circuits may be inadvertently activated by misadjustment of the receiver controls by a serviceman. Also, most projection TV receivers and monitors include a "setup" switch to enable the cut off of the various CRTs to be appropriately established. Inadvertently turning the receiver off while in the setup mode can also seriously compromise the blanking circuit and cause phosphor burn. Accordingly, there is a need in the art for a turn-off circuit for a projection type television CRT that precludes the possibility of phosphor burn.

OBJECTS OF THE INVENTION

A principal object of the invention is to provide a novel turn-off circuit for a CRT.

Another object of the invention is to provide a video system that minimizes the likelihood of CRT phosphor burn on turn-off.

BRIEF DESCRIPTION OF THE DRAWING

These and other objects and advantages of the invention will be apparent upon reading the following description in conjunction with the drawing, the single figure of which is a partial block, partial schematic diagram of a CRT turn-off system constructed in accordance with the invention.

DESCRIPTION OF THE PREFERRED EMBODIMENT

Referring to the single figure of the drawings, a projection TV receiver includes a control block 10, indicated as containing a microprocessor, that supplies an ON or an OFF signal to the base of a NPN transistor 14. The base of transistor 14 is coupled to ground through a capacitor 12 whereas its emitter is connected directly to ground. The collector of transistor 14 is connected through a resistor 16 to the base of a PNP transistor 18 having an emitter that is connected to the 12 volt DC standby B+ voltage of a switched mode power supply 30. The collector of transistor 18 is connected to ground through a relay coil 20 which, as indicated by the dashed lines, operates a set of contacts 22. The collector is also connected through a resistor 24 to an ON/OFF input terminal 29 of power supply 30. Input terminal 29 is coupled to ground by the parallel combination of a resistor 26 and a filter capacitor 28. Power supply 30 is connected by means of an AC line cord and plug 32 to a conventional source of household power. Power supply 30 includes both a switched low B+ voltage output terminal 33 and a switched high B+ voltage output terminal 35. The switched high B+ voltage (130 volts DC) is supplied to one contact of contact set 22. The other contact of contact set 22 is connected to a horizontal deflection circuit 36 and to ground through a capacitor 34. The switched low B+ voltage (12 volts DC) is also supplied to horizontal deflection 36. Horizontal deflection circuit 36 is in all respects conventional and includes suitable transistors and transformers for developing horizontal deflection voltages for application to a horizontal deflection winding 44 in a suitable yoke (not shown) that is positioned on the neck of a CRT 42. As is well-known, the 12 volt DC is the low B+ voltage driving the various deflection circuit transistors that control the development of the deflection voltages. Horizontal deflection circuit 36 is also coupled to a high voltage circuit 38 where, in a well-known manner, the high (25–30 kilovolt) voltage is developed for application to CRT 42. Finally, a source of video input 40 is shown coupled to the neck of CRT 42, it being understood that the electron gun structure in the tube is omitted for the sake of clarity.

In operation, switched mode power supply 30 is either on, or in standby. The 12 volt standby B+ potential is therefore present before the receiver is turned on. The 12 volt B+ for low level drive, however, is switched and is therefore not present when the receiver is in the standby mode. The actual construction and operation of switched mode power supply 30 is well-known in the art and will not be described herein. Suffice it to say that the 12V switched B+ and the 130V switched B+ are turned on by application of the ON voltage (1.79 volts) at input terminal 29 and are turned OFF when that voltage is removed. Control microprocessor 10 supplies a 1.7 volt ON signal to the base of transistor 14 to accomplish the switching. It should be appreciated that in a conventional circuit, that is, one not utilizing the invention, control microprocessor 10 would directly supply input terminal 29 of power supply 30.

The 1.7 volts at the base of transistor 14 drives transistor 14 conductive which, in turn, forward biases transistor 18 and energizes relay winding 20. Contact set 22 is closed and applies the 130 volts DC from power supply 30 to horizontal deflection circuit 36. (The full application of this voltage is delayed for a short period of time due to charging of capacitor 34.) The potential at the collector of transistor 18, while also delayed somewhat by the charging of capacitor 28, also causes power supply 30 to supply 12V B+ for the low voltage drive circuits in horizontal deflection circuit 36. Thus the necessary deflection voltages for deflection winding 44 and the high voltage for CRT 42 are produced. The initial delay in turning on CRT 42 is not objectionable nor is it harmful since the heater in the CRT takes time to reach its operating temperature at which it emits significant quantities of electrons.

Upon shutdown, however, a different result obtains. Responsive to a suitable signal from control 10, transistor 14 is cut off and drives transistor 18 non-conductive. Relay 20 is immediately de-energized and opens contact set 22, which interrupts the 130 volt DC supply to the horizontal deflection circuit 36. The potential change at the collector of transistor 18 is, however, not immediately presented to input terminal 29. It is delayed by the discharge of capacitor 28 through resistor 26, and through resistor 24 and relay winding 20. Consequently, the power supply 30 does not receive a turn-off signal until approximately ½ to 1 second later. The 12 volt B+ for low level drive to deflection circuit 36 is maintained and the horizontal deflection circuit continues to operate. The magnitude of the deflection and the size of the developed raster decreases since its 130V B+ operating potential is rapidly decaying as capacitor 34 discharges. Simultaneously, the high voltage developed by high voltage circuit 38 decays and the net result is that the raster size and high voltage are reduced together. The high voltage energy storage in the CRT is rapidly dissipated because the video drive and deflection system are still effective and when power supply 30 switches off the 12 volt B+ low level drive voltage, the high voltage is substantially extinguished and the beam energy is low. Thus a safe shutdown is provided for CRT 42.

The provision of the delay capacitor 34 is preferred although not required. Capacitor 34 enables the decay in the deflection and high voltages to occur at a slower rate and permits greater control of shutdown.

What has been described is a novel shutdown circuit for a CRT that eliminates the potential for phosphor burn of the CRT screen. It is recognized that numerous changes in the described embodiment of the invention will be apparent to those skilled in the art without departing from its true spirit and scope. The invention is to be limited only as defined in the claims.

What is claimed is:

1. In combination with a power supply adapted to supply power to a cathode ray tube;
    deflection means coupled between said cathode ray tube and said power supply, said deflection means including a high B+ voltage terminal and a low B+ voltage terminal;
    high voltage generation means coupled between said cathode ray tube and said deflection means; and
    shutdown means, responsive to turn-off of said power supply, for maintaining the voltage at said low B+ voltage terminal longer than the voltage at said high B+ voltage terminal for preventing phosphor burn in said cathode ray tube.

2. The combination of claim 1 wherein said power supply is of the switched mode type that is turned off in response to a turn-off signal and wherein said shutdown means includes delay means coupled to said switched mode power supply for delaying application of said turn-off signal and further includes means for disconnecting said high B+ voltage terminal from said switched mode power supply responsive to said turn-off signal.

3. The combination of claim 2 wherein said disconnecting means comprise transistorized switch means.

4. The combination of claim 3 wherein said delay means comprise a resistance-capacitance charging circuit.

5. The combination of claim 4 wherein said transistorized switch means includes a relay having a set of contacts for interrupting the connection between said high B+ voltage terminal and said switched mode power supply.

6. In combination:
    a cathode ray tube;

high voltage generation means coupled to said cathode ray tube;

deflection means including operating means and drive means being coupled to said high voltage generation means;

a switched mode power supply delivering voltages to both said drive means and said operating means in said deflection means;

means supplying a turn-off signal for said switched mode power supply;

delay means, including a resistance-capacitance circuit coupled to said switched mode power supply for delaying turn-off thereof responsive to said turn-off signal; and a transistor-operated relay having a set of contacts for disrupting said voltage to said operating means in response to said turn-off signal, whereby said operating means and said high voltage means for said cathode ray tube are disabled before said drive means.

7. The method of safety shutting down a video system including a cathode ray tube deflection system powered from a switch mode power supply that applies operating voltage and drive voltage to said deflection system, comprising the steps of:

developing a turn-off signal;

providing a relay operated by a transistor for controlling application of said operating voltage to said deflection system;

applying said turn-off signal to said transistor;

delaying application of said turn-off signal to said switch mode power supply and reducing the operating voltage to said deflection system, to permit decay of the high voltage applied to the cathode ray tube while maintaining the deflection system active.

* * * * *